(12) United States Patent
Chang

(10) Patent No.: US 7,313,187 B2
(45) Date of Patent: Dec. 25, 2007

(54) HIGH-SPEED SERIAL LINKING DEVICE WITH DE-EMPHASIS FUNCTION AND THE METHOD THEREOF

(75) Inventor: Chi Chang, Taipei (TW)

(73) Assignee: Via Technologies, Inc., Taipei (TW)

( * ) Notice: Subject to any disclaimer, the term of this patent is extended or adjusted under 35 U.S.C. 154(b) by 705 days.

(21) Appl. No.: 10/856,044

(22) Filed: May 28, 2004

(65) Prior Publication Data

US 2005/0018778 A1 Jan. 27, 2005

(30) Foreign Application Priority Data

Jul. 22, 2003 (TW) ............................... 92120025 A

(51) Int. Cl.
*H04B 3/00* (2006.01)
*H04L 25/06* (2006.01)

(52) U.S. Cl. ....................... 375/257; 375/318

(58) Field of Classification Search ................ 375/257, 375/224, 318, 242, 354; 341/137, 155; 326/82
See application file for complete search history.

(56) References Cited

U.S. PATENT DOCUMENTS 6,756,926 B2 * 6/2004 Kuwata ...................... 341/137

2001/0031027 A1 * 10/2001 Lindsay ...................... 375/354

* cited by examiner

*Primary Examiner*—Khai Tran
(74) *Attorney, Agent, or Firm*—Thomas, Kayden, Horstemeyer & Risley

(57) ABSTRACT

A high-speed serial linking device with de-emphasis function for receiving a parallel data and accordingly outputting a de-emphasized transmission differential pair. The high-speed serial linking device includes a parallel-to-serial unit, a pre-driver, and an output driver. The parallel-to-serial unit is used to receive a parallel data and further serializes the parallel data into a serial data and a delayed serial data. The pre-driver outputs a data differential pair according to the serial data and outputs a delayed-and-inverted differential pair according to the delayed serial data. The output driver unit is used to receive the data differential pair and the delayed-and-inverted differential pair to accordingly output a de-emphasized transmission differential pair.

18 Claims, 5 Drawing Sheets

HIGH-SPEED SERIAL LINKING DEVICE WITH DE-EMPHASIS FUNCTION AND THE METHOD THEREOF

This application claims the benefit of Taiwan application Serial No. 092120025, filed Jul. 22, 2003, the subject matter of which is incorporated herein by reference.

BACKGROUND OF THE INVENTION

1. Field of the Invention

The invention relates in general to a high-speed serial linking device, and more particularly to a high-speed serial linking device with de-emphasis function and the method thereof.

2. Description of the Related Art

As higher and higher data transmission speed in computer is requested, existing parallel transmission architectures, PCI architecture for instance, become insufficient to satisfy consumers' demand. Parallel link architectures use plural linking lines and further synchronize the clock pulses of these linking lines. It is very difficult to synchronize the clock pulses of plural linking lines under high-speed data transmission.

The current practice of high-speed data transmission uses serial link transmission such as PCI express architecture whose data rate can be as high as 2.5 GHz or over. But, such high frequency signals will suffer a large amount of signal loss during transmission on the circuit board. Normally, de-emphasis technology is used to reduce high-frequency signal loss.

FIG. 1 is the diagram showing the wave form of a high-frequency serial link signal transmission using de-emphasis technology. High-frequency signals can be transmitted via a transmission differential pair TDP and TDN. When two consecutive bits are identical, high-frequency signal loss becomes significant. Hence de-emphasis technology is used to reduce the voltage swings of the second bit and of onward bits in a string of identical bits so as to reduce high-frequency signal loss. Take TDN signal for example. The bit values of TDN signal are shown at the bottom of FIG. 1 wherein two consecutive '0's occur at D3 and D4 while three consecutive '0's occur at D6, D7 and D8. With the occurrence of consecutively repeated bits, the voltage swings of D4, D7 and D8, the second and onward bits in a string of identical bits, are reduced so as to reduce high-frequency signal loss. The above application still holds true when consecutive '1's occur and is not repeated here.

The above de-emphasis method first of all checks the occurrence of consecutively repeated bits: if found, these consecutively repeated bits are modulated to reduce voltage swings. However, since the data rate of high-frequency signals is getting faster and faster, the bit time becomes shorter and shorter. For example, one bit time unit under PCI express architecture is only 400 ps. It is extremely difficult to execute the inspection circuit and modulation circuit of de-emphasis technology within such a short bit time.

SUMMARY OF THE INVENTION

It is therefore an object of the invention to provide a high-speed serial linking device with de-emphasis function and the method thereof.

It is another object of the invention to provide a high-speed serial linking device with de-emphasis function for receiving a parallel data and accordingly outputting a de-emphasized transmission differential pair with de-emphasis function. The high-speed serial linking device includes a parallel-to-serial unit, a pre-driver, and an output driver. The parallel-to-serial unit is used to receive a parallel data and further serializes the parallel data into a serial data and a delayed serial data. The delayed serial data is one serial bit time lag behind the serial data. The pre-driver is used to receive the serial data and the delayed serial data to output a data differential pair according to the serial data and outputs a delayed-and-inverted differential pair according to the delayed serial data. The delayed-and-inverted differential pair is the inverse of and is one serial bit time lag behind the data differential pair. The output driver unit is used to receive a data differential pair and a delayed-and-inverted differential pair to accordingly output a de-emphasized transmission differential pair.

It is another object of the invention to provide a high-speed serial linking method with de-emphasis function for receiving a parallel data and accordingly outputting a de-emphasized transmission differential pair. Firstly, the parallel data is serialized into a serial data and a delayed serial data, wherein the delayed serial data is one serial bit time lag behind the serial data. Next, the serial data is converted into a data differential pair while the delayed serial data is converted into a delayed-and-inverted differential pair, wherein the delayed-and-inverted differential pair is the inverse of and is one serial bit time lag behind the data differential pair. Lastly, by means of the data differential pair and the delayed-and-inverted differential pair, a de-emphasized transmission differential pair is generated.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
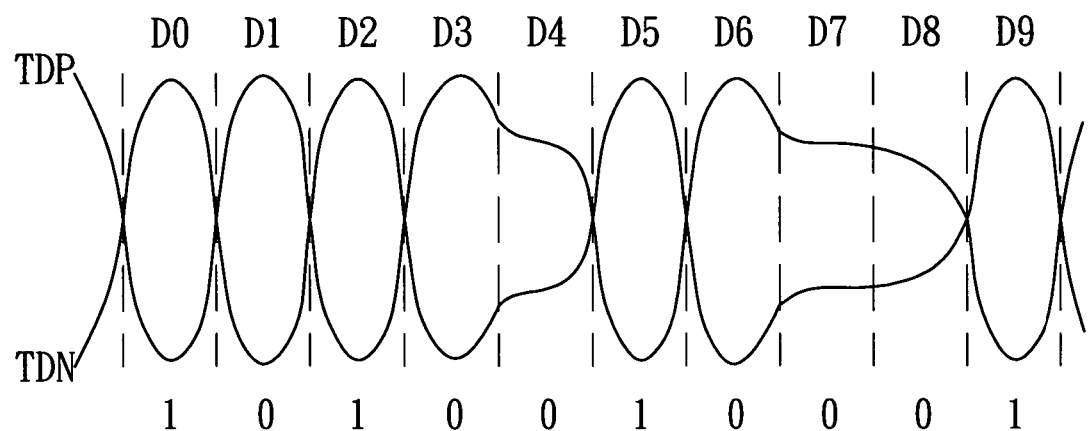
FIG. 1 shows the wave form of a high-frequency serial link signal transmission using de-emphasis technology.
Figure 2:
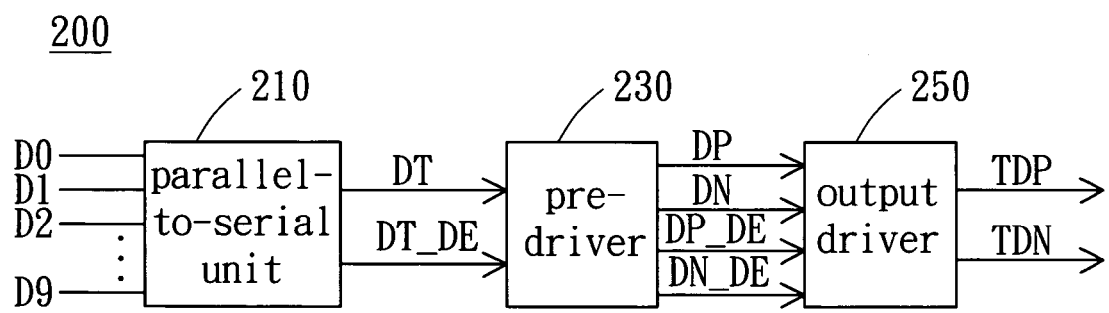
FIG. 2 shows the schematic diagram of a high-frequency serial linking device with de-emphasis function according to one preferred embodiment of the invention.

Referring to FIG. 2, the schematic diagram of a high-frequency serial linking device with de-emphasis function according to one preferred embodiment of the invention. High-frequency serial linking device 200 receives 10-bit parallel data, [D0, D1, . . . D9], and accordingly outputs a de-emphasized transmission differential pair, TDP and TDN, wherein high-frequency serial linking device 200 includes parallel-to-serial unit 210, pre-driver 230 and output driver 250. Parallel-to-serial unit 210 receives parallel data, [D0, D1, . . . D9], and further serializes the parallel data into serial data DT. Apart from serializing parallel data into serial data, parallel-to-serial unit 210 further uses parallel data [D0, D1, . . . D9] to generate a delayed serial data DT_DE, which is one bit time lag behind the serial data DT. Pre-driver 230 receives serial data DT, converts the serial data DT into a data differential pair, DP and DN, and thereby outputs the data differential pair. Meanwhile, pre-driver 230 receives delayed serial data DT_DE and thereby outputs delayed-and-inverted differential pair DP_DE and DN_DE. According to data differential pair DP and DN and delayed-and-inverted differential pair DP_DE and DN_DE, output driver 250 outputs transmission differential pair TDP and TDN.

Figure 3A:
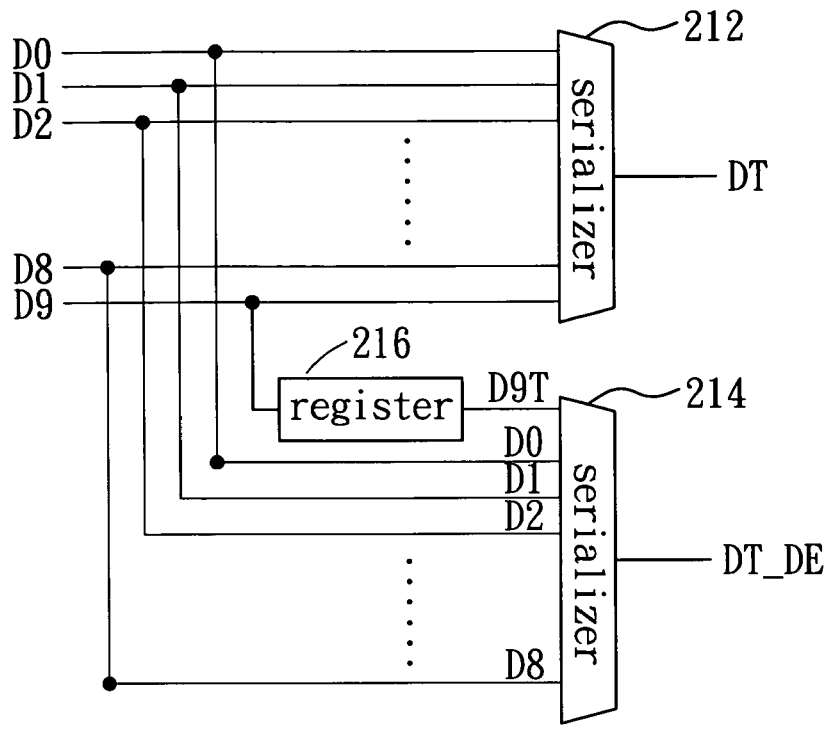
FIG. 3A shows the schematic diagram of a parallel-to-serial unit.

FIG. 3A shows the schematic diagram of parallel-to-serial unit 210. Parallel-to-serial unit 210 includes serializers 212 and 214 and register 216. Serializer 212 receives parallel data, [D0, D1, . . . D9], serializes the parallel data and outputs serial data DT. Register 216 is used to store the last bit D9 in the parallel data and output it after one serial bit time. That is to say, what is outputted by register 216 is the last bit D9T in the previous parallel data, [D0T, D1T, . . . , D9T]. Serializer 214 receives parallel data, D9T and D0~D8, serializes it, and outputs delayed serial data DT_DE, wherein D9T is the last bit in the previous parallel data outputted by register 216 while D0~D8 are the first 9 bits in the present parallel data.

Figure 3B:
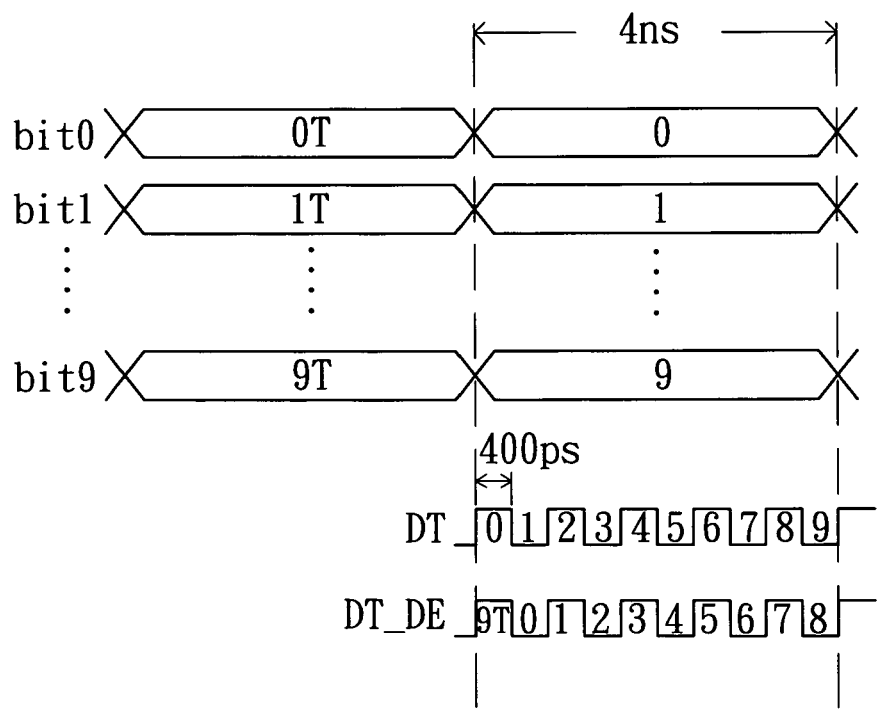
FIG. 3B shows the clock pulses of a parallel data and serial data DT and DT_DE.

FIG. 3B shows the clock pulses of a parallel data and serial data DT and DT_DE. Each and every parallel bit time in parallel data [D0, D1, . . . , D9] is 4 ns, for example. Serializer 212 samples each and every bit in parallel data [D0, D1, . . . , D9] under 10× frequency and thereby outputs serial data DT whose serial bit time is 400 ps. Serializer 214 samples each and every bit in parallel data [D9T, D0, D1, . . . , D8] under 10× frequency and accordingly outputs delayed serial data DT_DE. Delayed serial data DT_DE is 1 serial bit time lag behind serial data.

Figure 4:
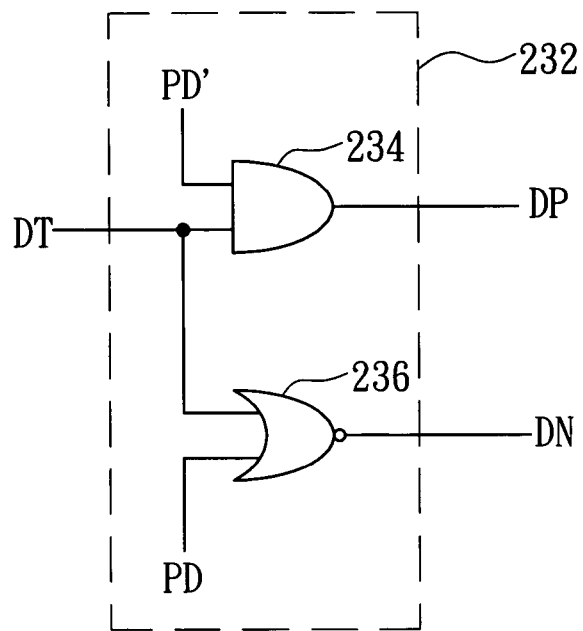
FIG. 4 shows the schematic diagram of a pre-driver.
Figure 4:
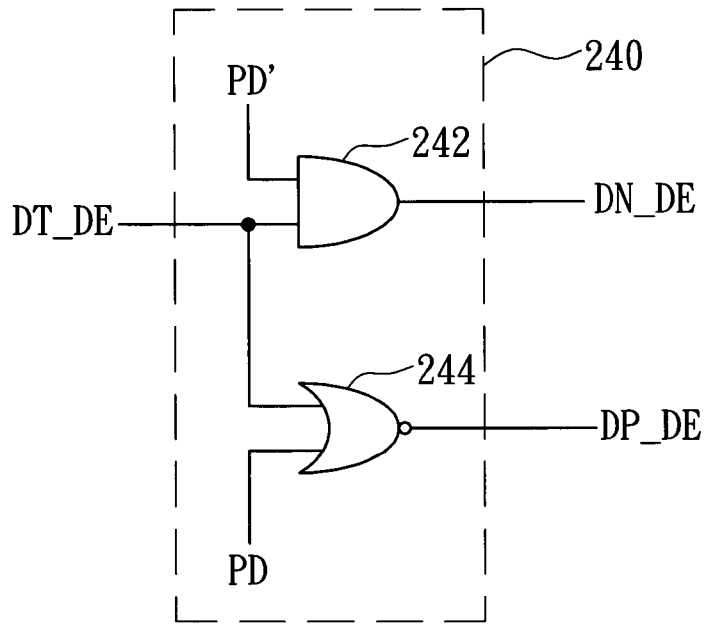

FIG. 4 shows the schematic diagram of pre-driver 230. Pre-driver 230 includes data differentiator 232 and inverse data differentiator 240. Data differentiator 232 receives serial data DT, and thereby outputs a data differential pair, DP and DN. Inverse data differentiator 240 receives delayed serial data DT_DE and thereby outputs delayed-and-inverted differential pair, DN_DE and DP_DE, which are phase inverse of and one serial bit time lag behind the data differential pair DP and DN.

Data differentiator 232 includes AND gate 234 and NOR gate 236. AND gate 234 receives control signal PD' and serial data DT and thereby outputs DP, the positive differential signal of the data differential pair. NOR gate 236 receives control signal PD and serial data DT and thereby outputs DN, the negative differential signal of the data differential pair. Control signal PD' is the inverse of control signal PD.

Inverse data differentiator 240 includes AND gate 242 and NOR gate 244. AND gate 242 receives control signal PD' and delayed serial data DT_DE to output negative delayed-and-inverted differential signal DN_DE. NOR gate 244 receives control signal PD and delayed serial data DT_DE to output positive delayed-and-inverted differential signal DP_DE.

Figure 5A:
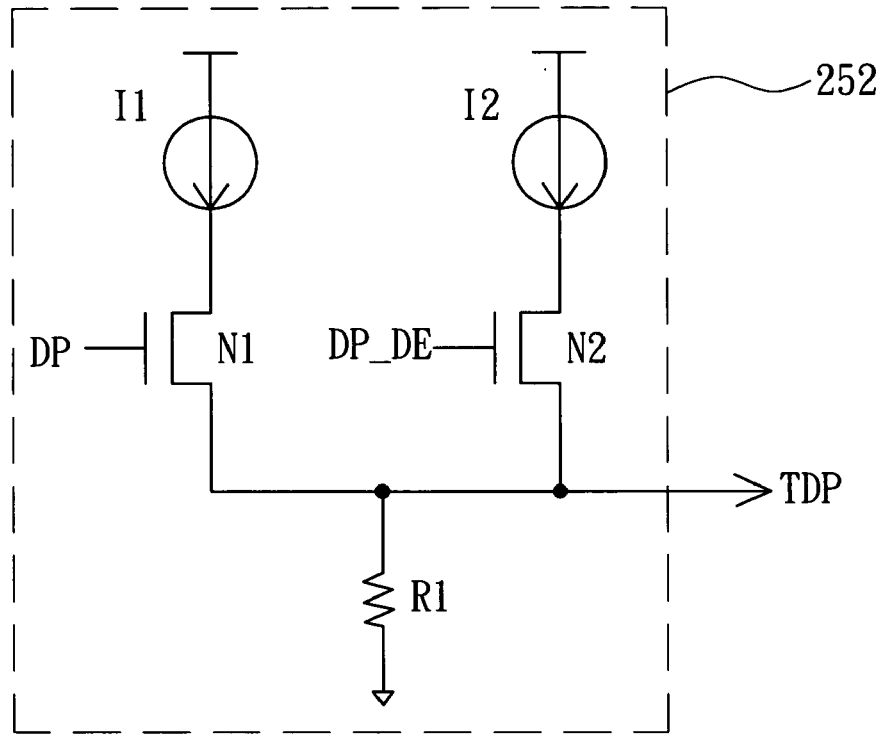
FIG. 5A shows the schematic diagram of an output driver.
Figure 5A:
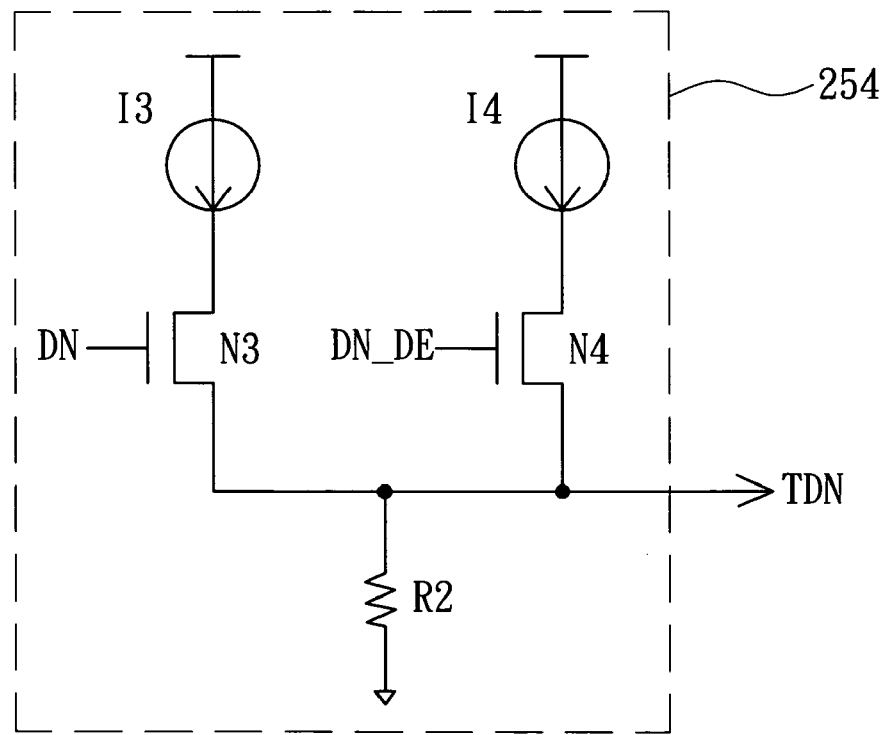

FIG. 5A is the schematic diagram of the output driver 250. Output driver 250 includes first output circuit 252 and second output circuit 254. First output circuit 252 receives positive differential signal DP and positive delayed-and-inverted differential signal DP_DE to output positive transmission differential signal TDP. Second output circuit 254 receives negative differential signal DN and negative delayed-and-inverted differential signal DN_DE to output negative transmission differential signal TDN.

First output circuit 252 includes current sources I1 and I2, transistors N1 and N2, and resistor R1, wherein current source I1 is larger than current source I2. Transistor N1 is controlled by differential signal DP to turn on and off. Transistor N2 is controlled by positive delayed-and-inverted differential signal DP_DE to turn on and off. The voltage value of positive differential signal TDP is decided according to the inflow current of resistor R1.

Second output circuit 254 includes current sources I3 and I4, transistors N3 and N4, and resistor R2. Transistor N3 is controlled by negative differential signal DN to turn on and off. Transistor N4 is controlled by negative delayed-and-inverted differential signal DP_DE to turn on and off. The voltage value of the negative transmission differential signal TDN is decided according to the inflow current of resistor R2. Basically, the resistance of resistor R2 is designed to be the same with the resistance of resistor R1, while the current of current source I3 is the same with the current of current source I1 and so is the current of current source I4 the same with the current of current source I2. Consequently, the current of current source of I3 is larger than the current of current source I4.

Figure 5B:
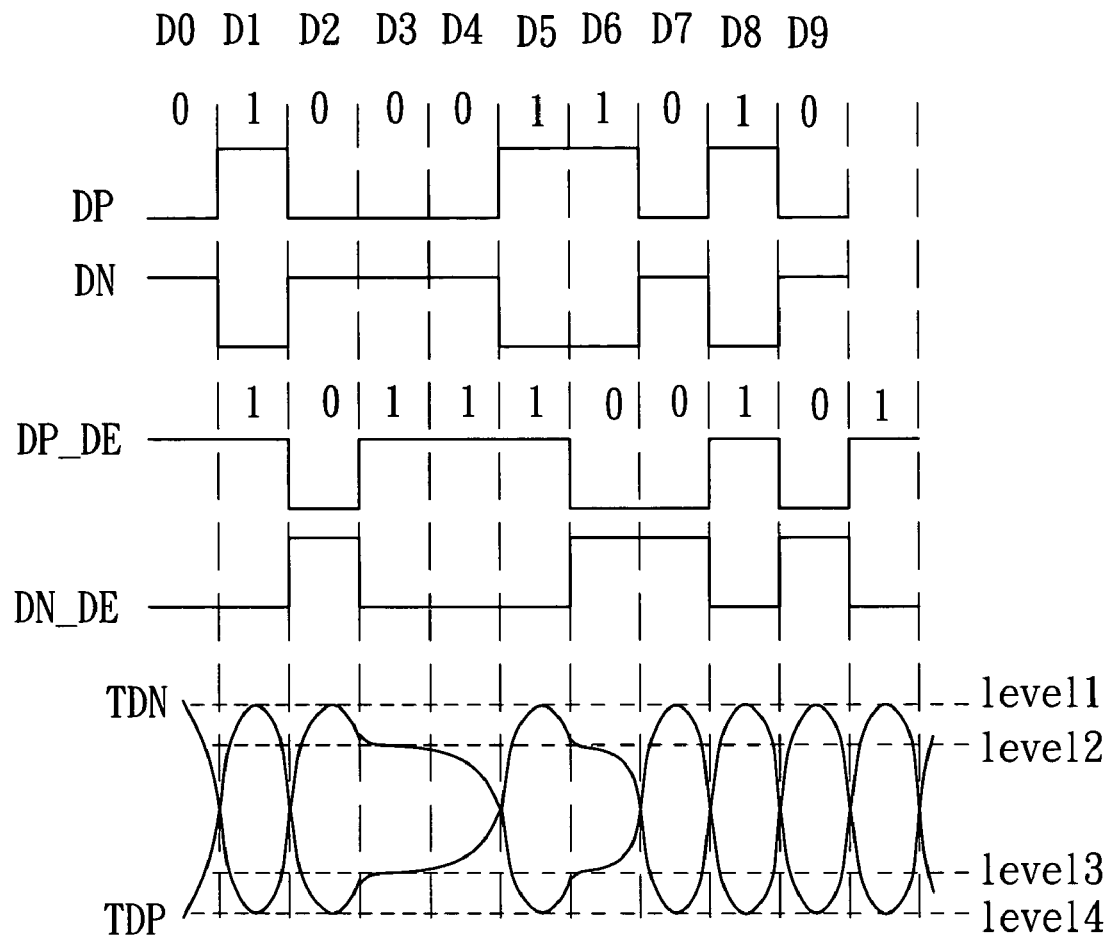
FIG. 5B shows the clock pulses of the I/O signals of an output driver.

FIG. 5B is the clock pulses of the I/O signals of output driver 250. The bit values shown in data [D0, D1, . . . , D9] of data differential pair DP and DN are 0100011010. Delayed-and-inverted differential pair DP_DE and DN_DE is the inverse of and is one bit time lag behind differential pair DP and DN. Transmission differential pair TDP and TDN has four levels, namely level 1, level 2, level 3 and level 4 when ranked in a descending order.

Firstly, the operations of first output circuit 252 are illustrated as follows. Take bit D1 for example, wherein both positive differential signal DP and positive differential signal DP_DE are 1. Both transistors N1 and N2 are turned on and thereby the inflow current of resistor R1 is (I1+I2). Therefore, positive transmission differential signal TDP is at level 1, the maximum level which reads as (I1+I2)*R1. D1 of positive delayed-and-inverted differential signal DP_DE is the inverse of bit D0 of positive differential signal DP. That is, if positive differential signal DP and positive delayed-and-inverted differential signal DP_DE in the same bit time are identical, the value of the present bit and is different from the value of the previous bit, i.e., D1 is different from D0, and in such situation, the present bit value of 1 contributes to level 1 of positive transmission differential signal TDP.

Take bit D2 for example, wherein both positive differential signal DP and positive delayed-and-inverted differential signal DP_DE are 0. Both transistors N1 and N2 are turned off and thereby the inflow current of resistor R1 equals 0. Consequently, positive transmission differential signal TDP is at level 4, the minimum level whose value is 0. That is, if positive differential signal DP and positive delayed-and-inverted differential signal DP_DE in the same bit time are identical, the value of the present bit is different from the value of the previous bit, and in such situation, the present bit value of 0 contributes to level 4 of positive transmission differential signal TDP.

Take bit D3 for example, wherein positive differential signal DP equals 0 and positive delayed-and-inverted differential signal DP-DE equals 1. Transistor N1 is turned off while transistor N2 is turned on, and thereby the inflow current of resistor R1 is I2. Therefore, positive transmission differential signal TDP is at level 3, which has a magnitude of I2*R1 and is larger than level 4. That is, if positive differential signal DP and positive delayed-and-inverted differential signal DP_DE in the same bit time are different, the value of the present bit is identical to the value of the previous bit, and in such situation, the present bit value of 0 contributes to level 3 of positive transmission differential signal TDP.

Next, the operations of second output circuit 254 are illustrated as follows. Take bit D1 for example, wherein both negative differential signal DN and negative delayed-and-inverted differential signal DN_DE are 0. Both transistors N3 and N4 of second output circuit 254 are turned off, and thereby the inflow current of resistor R1 equals 0. Therefore, negative transmission differential signal TDN is at level 4, the minimum level.

Take bit D2 for example, wherein both negative differential signal DN and negative delayed-and-inverted differential signal DN_DE are 1. Both transistor N2 and N3 are turned on, and thereby the inflow current of resistor R2 equals (I3+I4). Therefore, negative transmission differential signal TDN is at level 1, the maximum level whose value reads as (I3+I4)*R2. That is, if negative differential signal DN and negative delayed-and-inverted differential signal DN_DE of the same bit time are identical, the value of the present bit is different from the value of the previous bit, and in such situation, the present bit value of 1 contributes to level 1 of negative transmission differential signal TDN.

Take bit D3 for example, wherein negative differential signal DN equals 1 and negative delayed-and-inverted differential signal DN_DE equals 0. Transistor N3 is turned on while transistor N4 is turned off, and thereby the inflow current of resistor R2 equals I3. Therefore, negative transmission differential signal TDN is at level 2 whose value reads as I3*R1. That is, if negative differential signal DN and negative delayed-and-inverted differential signal DN_DE of the same bit time are different, the value of the present bit is identical to the value of the previous bit, and in such situation, the present bit value of 1 contributes to level 2 of negative transmission differential signal TDN.

Unlike a conventional de-emphasis method which requires complicated high-speed inspection circuit, the high-speed serial linking device with de-emphasis function of the embodiment achieves de-emphasis function by simple circuits.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A high-speed serial linking device with de-emphasis function, comprising:
    a parallel-to-serial unit which receives a parallel data to serialize the parallel data into a serial data and a delayed serial data, wherein the delayed serial data is one serial bit time lag behind the serial data;
    a pre-driver which receives the serial data and the delayed serial data to output a data differential pair according to the serial data and output a delayed-and-inverted differential pair according to the delayed serial data, wherein the delayed-and-inverted differential pair is the inverse of and one serial bit time lag behind the data differential pair; and
    an output driver unit which receives the data differential pair and the delayed-and-inverted differential pair to output a de-emphasized transmission differential pair.

2. The high-speed serial linking device according to claim 1, wherein the parallel-to-serial unit comprises:
    a first serializer which receives and serializes the parallel data to output the serial data;
    a register which receives a last bit of the parallel data and further has a last bit of the parallel data delayed and outputted; and
    a second serializer which generates and outputs the delayed serial data according to the parallel data and the output of the register.

3. The high-speed serial linking device according to claim 1, wherein the pre-driver comprises:
    a data differentiator which receives the serial data and accordingly outputs the data differential pair; and
    an inverse data differentiator which receives the delayed serial data and outputs the delayed-and-inverted differential pair.

4. The high-speed serial linking device according to claim 3, wherein the data differentiator comprises:
    an AND gate which receives a first control signal and the serial data and outputs a positive differential signal of the data differential pair; and
    an NOR gate which receives a second control signal and the serial data and outputs a negative differential signal of the data differential pair, wherein the first control signal is the inverse of the second control signal.

5. The high-speed serial linking device according to claim 3, wherein the inverse data differentiator comprises:
    an AND gate which receives a first control signal and the delayed serial data and outputs a negative differential signal of the delayed-and-inverted differential pair; and
    an NOR gate which receives a second control signal and the delayed serial data and accordingly outputs a positive differential signal of the delayed-and-inverted differential pair, wherein the first control signal is the inverse of the second control signal.

6. The high-speed serial linking device according to claim 1, wherein the output driver comprises:
    a first output circuit which receives a positive delayed-and-inverted differential signal of the data differential pair and a positive differential signal of the delayed-and-inverted differential pair to output a positive transmission differential signal of the de-emphasized transmission differential pair; and
    a second output circuit which receives a negative differential signal of the data differential pair and a negative delayed-and-inverted differential signal of the delayed-and-inverted differential pair to output a negative transmission differential signal of the de-emphasized transmission differential pair.

7. The high-speed serial linking device according to claim 6, wherein the first output circuit comprises:
    a first current source;
    a second current source;
    a resistor;
    a first switch which decides if the current of the first current source is allowed to flow to the resistor according to the positive differential signal of the data differential pair; and
    a second switch which decides if the current of the second current source is allowed to flow to the resistor according to the positive delayed-and-inverted differential signal of the delayed-and-inverted differential pair.

8. The high-speed serial linking device according to claim 7, wherein the first switch and the second switch are transistors.

9. The high-speed serial linking device according to claim 7, wherein the current of the first current source is larger than the current of the second current source.

10. The high-speed serial linking device according to claim 6, wherein the second output circuit comprises:
   a first current source;
   a second current source;
   a resistor;
   a first switch which decides if the current of the first current source is allowed to flow to the resistor according to the negative differential signal of the data differential pair; and
   a second switch which decides if the current of the second current source is allowed to flow to the resistor according to the negative delayed-and-inverted differential signal of the delayed-and-inverted differential pair.

11. The high-speed serial linking device according to claim 10, wherein the first switch and the second switch are transistors.

12. The high-speed serial linking device according to claim 10, wherein the current of the first current source is larger than the current of the second current source.

13. A high-speed serial linking transmission method with de-emphasis function, comprising the steps of:
   serializing a parallel data into a serial data and a delayed serial data, wherein the delayed serial data is one serial bit time lag behind the serial data;
   converting the serial data and the delayed serial data into a data differential pair and a delayed-and-inverted differential pair respectively, wherein the delayed-and-inverted differential pair is the inverse of and is one serial bit time lag behind the data differential pair; and
   generating a de-emphasized transmission differential pair according to the data differential pair and the delayed-and-inverted differential pair.

14. The method according to claim 13, wherein a positive transmission differential signal of and a negative transmission differential signal of the de-emphasized transmission differential pair respectively belongs to one of the four levels ranked in a descending order, namely level 1, level 2, level 3 and level 4.

15. The method according to claim 13, wherein the serializing step comprises:
   serializing the parallel data into a serial data;
   storing a last bit of the parallel data and outputting it after a serial bit time; and
   generating a delayed serial data which is one serial bit time lag behind the serial data.

16. The method according to claim 13, wherein the generation of the data differential pair comprises:
   performing AND operation on a first control signal and the serial data to generate a positive differential signal of the data differential pair; and
   performing NOR operation on a second control signal and the serial data to generate a negative differential signal of the data differential pair, wherein the second control signal is the inverse of the first control signal.

17. The method according to claim 13, wherein the generation of the delayed-and-inverted differential pair comprises the steps of:
   performing AND operation on a first control signal and the delayed serial data to generate a negative delayed-and-inverted differential signal of the delayed-and-inverted differential pair; and
   performing NOR operation on a second control signal and the delayed serial data to generate a positive delayed-and-inverted differential signal of the delayed-and-inverted differential pair, wherein the second control signal is the inverse of the first control signal.

18. The method according to claim 13, wherein the generation of the de-emphasized transmission differential pair comprises:
   generating a positive transmission signal of the de-emphasized transmission differential pair according to a positive differential signal of the data differential pair and a positive delayed-and-inverted differential signal of the delayed-and-inverted differential pair; and
   generating a negative transmission signal of the de-emphasized transmission differential pair according to a negative differential signal of the data differential pair and a negative delayed-and-inverted differential signal of the delayed-and-inverted differential pair.

* * * * *

UNITED STATES PATENT AND TRADEMARK OFFICE
CERTIFICATE OF CORRECTION

| | | |
|---|---|---|
| PATENT NO. | : 7,313,187 B2 | Page 1 of 1 |
| APPLICATION NO. | : 10/856044 | |
| DATED | : December 25, 2007 | |
| INVENTOR(S) | : Chang | |

It is certified that error appears in the above-identified patent and that said Letters Patent is hereby corrected as shown below:

In the Claims

Column 6

Lines 42-43, Claim 6, please delete "delayed-and-inverted"

Line 42, Claim 6, immediately following "positive", please insert --delayed-and-inverted--.

Signed and Sealed this

Twenty-fourth Day of March, 2015

Michelle K. Lee
*Director of the United States Patent and Trademark Office*

UNITED STATES PATENT AND TRADEMARK OFFICE
CERTIFICATE OF CORRECTION

| | | |
|---|---|---|
| PATENT NO. | : 7,313,187 B2 | Page 1 of 1 |
| APPLICATION NO. | : 10/856044 | |
| DATED | : December 25, 2007 | |
| INVENTOR(S) | : Chang | |

It is certified that error appears in the above-identified patent and that said Letters Patent is hereby corrected as shown below:

In the Claims

Column 6

Lines 39-40, Claim 6, please delete "delayed-and-inverted".

Line 41, Claim 6, immediately following "positive", please insert --delayed-and-inverted--.

This certificate supersedes the Certificate of Correction issued March 24, 2015.

Signed and Sealed this
Seventh Day of June, 2016

Michelle K. Lee
*Director of the United States Patent and Trademark Office*